United States Patent [15] 3,656,729
Borgert [45] Apr. 18, 1972

[54] MOLD FOR PREPARING CONCRETE SLOTTED FLOORS

[72] Inventor: Kenneth J. Borgert, St. Cloud, Minn.
[73] Assignee: Borget Concrete Products, Inc., St. Joseph, Minn.
[22] Filed: Oct. 9, 1970
[21] Appl. No.: 79,489

[52] U.S. Cl. ................................. 249/18, 249/159, 249/167, 249/172, 25/118 H, 249/91, 249/50
[51] Int. Cl. ................................................. E04g 11/42
[58] Field of Search .................... 249/18, 50, 118, 135, 137, 249/155, 159, 160, 163, 165, 167, 170, 171, 172; 25/125

[56] References Cited

UNITED STATES PATENTS 1,647,015  10/1927  Pinkerton .............................. 249/172
843,716  2/1907  Terry ...................................... 249/167

Primary Examiner—J. Spencer Overholser
Assistant Examiner—Dewalden W. Jones
Attorney—Merchant & Gould

[57] ABSTRACT

A mold for casting a T-shaped concrete slat useable in a slotted floor assembly is described. The mold includes an elongated mold section and a transversely extending end mold section; the two mold sections having reversely flared sidewalls for casting T-shaped slats which can be assembled in an adjacent lateral trunk-to-cross arm relationship to provide a self-spaced and self-secured slotted floor.

5 Claims, 4 Drawing Figures

PATENTED APR 18 1972 3,656,729
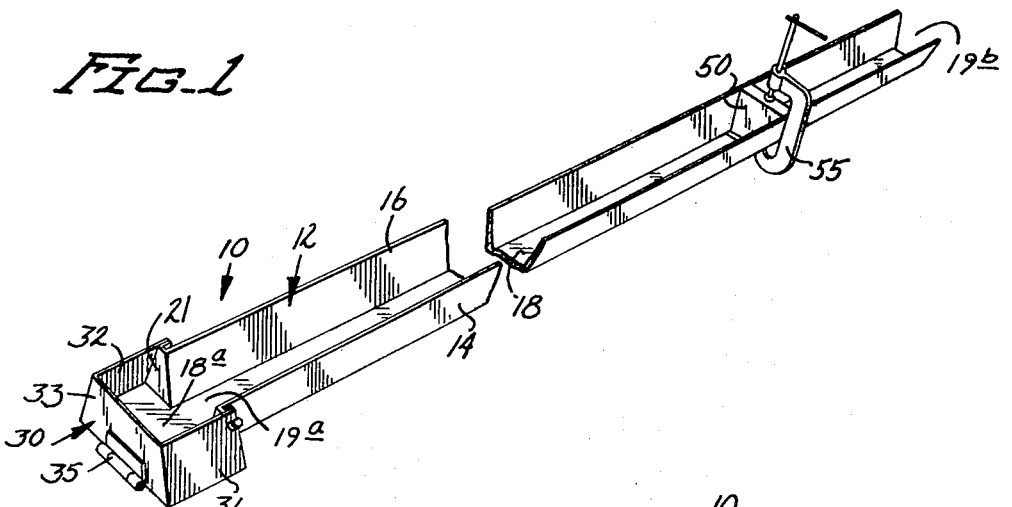
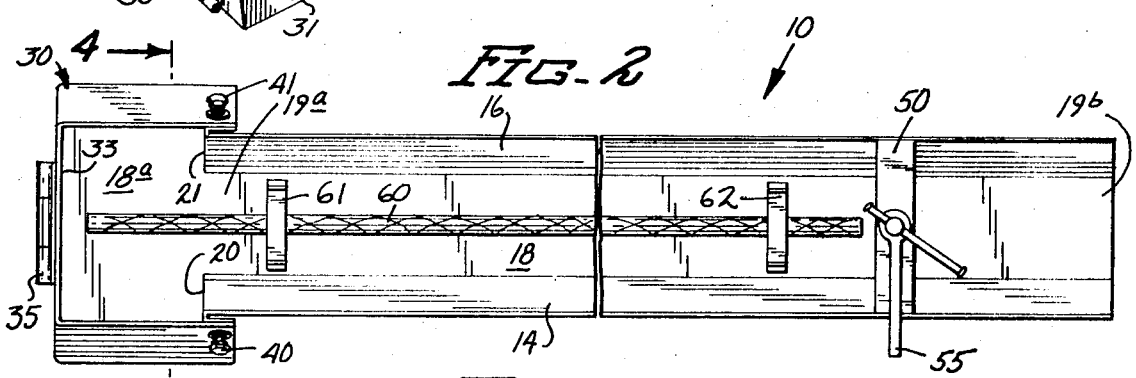
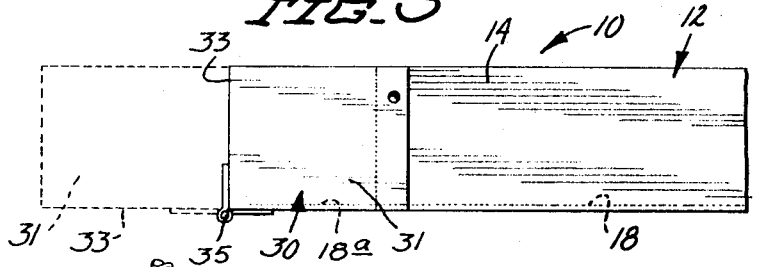
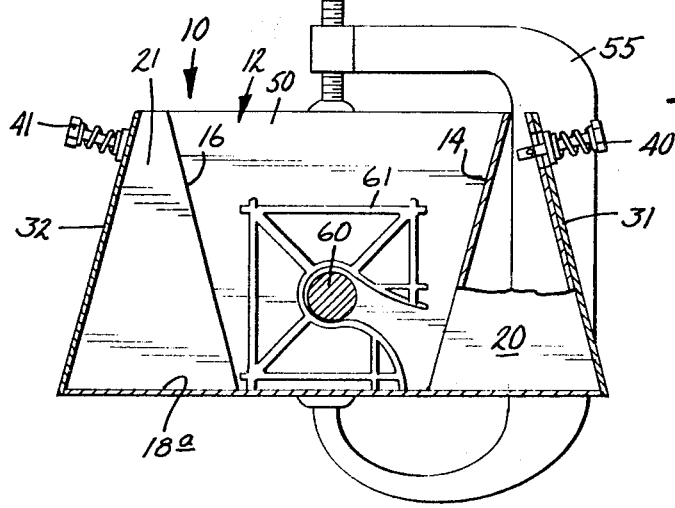
INVENTOR.
KENNETH J. BORGERT
BY Merchant & Gould
ATTORNEYS

MOLD FOR PREPARING CONCRETE SLOTTED FLOORS

BACKGROUND OF THE INVENTION

1. Field of the Invention

The present invention relates to a mold or form for providing slats which can be assembled to obtain a self-spacing, self-securing slotted floor.

CROSS-REFERENCE TO RELATED APPLICATIONS

To the extent applicable, the teachings contained in my copending Pat. application Ser. No. 79,490, filed Oct. 9, 1970, relating specifically to the slats cast in the form or mold provided by the present invention and the assembling of the slats into a slotted floor system are herein incorporated by reference.

2. Description of the Prior Art

The utilization of slotted floor systems has significantly increased during recent years. While slotted floor systems have found applications in a wide variety of areas, such systems have found particularly extensive use in farm areas. Here, the slotted floor constructions are used in structures for housing livestock such as hogs, sheep or cattle. The lateral spacing between the longitudinally extending slots allows animal waste to be worked through the slotted floor into a manure pit or gutter below primarily by movement of the animals thereabout. The removal of animal waste in this manner is highly efficient and, of course, improves sanitation and animal health by maintaining the structure relatively free of animal waste and other litter.

As a result of its relative inexpensiveness, durability and the safe-footing provided thereby, concrete is generally recognized as the preferred material from which to construct a slotted floor assembly. Presently, there are two types of molds generally in use for precasting the individual concrete slats comprising a slotted floor construction. A first type of mold provides a plain tapered slat. Utilization of such slats requires auxiliary spacers such as a notched concrete beam into which the ends of the slats are inserted to provide the desired spacing between the assembled slats. Alternatively, a second type of form is available which provides a tapered slat having a spacing lug cast integrally on each end thereof for providing and maintaining self-spacing of the assembled slats.

The self-spacing slats are generally preferred over the plain slats since such slats are more economical to install and are generally easier to maintain in a uniformly spaced relationship. However, the precast self-spacing slats presently available have two major disadvantages. First, the presently available molds do not allow the length of the individual slats to be conveniently varied. Thus, the slats cast in these molds are generally obtainable only in certain standard lengths. To obtain a non-standard length slat, an entirely new mold must be constructed resulting in considerable expense and delay. Secondly, the assembled slats generally do not form as secure a joint between adjacent slats as is desirable. This results in movement of the slats (e.g. separation of adjacent slats) necessitating continuous observation and maintenance of the slotted floor to prevent injury to animals carried thereby. Consequently, it is desirable to have a mold which provides slats which are (1) self-spacing, (2) self-securing, and (3) of any desired length.

SUMMARY OF THE INVENTION

In view of the foregoing, the molds or forms provided by the present invention are generally T-shaped having a first mold section defining the trunk of the T-shaped form and a second mold section generally transverse of an open end of the first mold section and defining the cross arm of the T-shaped mold. So shaped, the present mold provides a T-shaped slat having a length which is variable simply by varying the length of the first or elongated portion of the mold and which is suitable for assembling to provide a self-spaced slotted floor.

In a preferred embodiment, the elongated mold section has sidewalls flared upwardly and outwardly and a moveable end wall extending transversely between the sidewalls for varying the length of the elongated mold portion. In this embodiment, the second mold section is moveably connected (e.g. hinged) to the open end of the elongated section and defines a trough having a reverse flare (i.e. a complementary flare) relative to the elongated trough. This embodiment is particularly advantageous since it will form T-shaped slats having a readily alterable length and which, when assembled in a laterally adjacent trunk-to-cross arm relationship, will mate to provide a secure joint between adjacent slats. Further, this highly advantageous mold is of relatively simple design and, consequently, can be inexpensively produced.

BRIEF DESCRIPTION OF THE DRAWINGS

For a better understanding of the present invention reference should be had to the accompanying drawings wherein:

FIG. 1 is a perspective view of a preferred embodiment of the mold unit provided by the present invention, a portion thereof being broken away and shown in section;

FIG. 2 is an enlarged top view of the mold unit illustrated in FIG. 1 including a reinforcement rod position therein;

FIG. 3 is an enlarged fragmented side elevation of the mold unit illustrated in FIG. 1 showing a hinged end section thereof in an open end closed position; and FIG. 4 is a transverse cross-sectional view of the preferred mold unit along the line 4—4 of FIG. 2, a portion thereof being broken away and shown in section.

DETAILED DESCRIPTION OF THE PREFERRED EMBODIMENT

Referring now to the drawings wherein like numerals represent like parts of the invention throughout the various figures, the numeral 10 is used to designate the generally T-shaped mold unit or form provided by the present invention. As illustrated, mold 10 includes a first mold section 12 having longitudinally extending sidewalls 14 and 16 flared upwardly and outwardly from an elongated base 18. Sidewalls 14 and 16 and base 18 define an elongated cavity or trough suitable for forming the trunk of the T-shaped slat provided by mold 10. Elongated mold or trunk casting section 12 includes oppositely disposed first and second open ends 19a and 19b, respectively, defined by base 18 and sidewalls 14 and 16 at the coterminous ends thereof.

The sidewalls 14 and 16 include an end flange 20 and 21, respectively, integrally attached thereto at open end 19a of elongated mold section 12. The flanges each have a first portion directed transversely outwardly generally normal to the adjoining sidewall and a second portion connected to the outer edge of the first flange portion and extending toward open end 19b parallel to the longitudinal axis of elongated mold section 12. As can be seen in the accompanying drawings, and as will be described subsequently, the flanges 14 and 16 form first and second portions, respectively, of an inner end wall of a second or end mold section 30 generally transverse of elongated mold section 12 at open end 19a and which provides a trough for forming the cross arm of the T-shaped slat provided by mold 10 (i.e. end mold section 30 is suitable for casting an enlarged head or lug onto the end of the elongated slat cast in mold section 12).

The end mold or cross arm casting section 30 is partially defined by a projecting portion 18a of horizontal base 18 extending transversely outward from the open end 19a beyond the sidewalls 14 and 16. The remaining portion of the mold section 30 is defined by a pair of longitudinally extending upwardly and inwardly flared sidewalls 31 and 32 positioned along opposite outer edges of base portion 18a, a generally vertically directed outer end wall 33 extending transversely between the sidewalls 31 and 32, and the outwardly directed portions of flanges 20 and 21 which define the transversely extending inner end wall of mold section 30. As illustrated, sidewalls 31 and 32 and end wall 33 are integrally connected and hingeably mounted to horizontal base 18a by a hinge 35. A pair of keyed pins 40 and 41 secure the swingable mold section 30 to elongated mold section 12. As illustrated, pins 40 and 41 extend through circular openings in sidewalls 31 and 32 and are keyed to associated rectangular openings in the longitudinally directed portions of flanges 20 and 21, respectively. Numerous alternative types of fastening devices such as a turn button can, of course, be utilized.

The end mold section 30 has a reverse complementary draft from that of the elongated mold section 12. That is, whereas sidewalls 14 and 16 of mold section 12 are flared outwardly, the sidewalls 31 and 32 of mold section 30 are flared inwardly extending upwardly from base portion 18a at a generally complementary angle with respect to the outward draft of sidewalls 14 and 16. Further, to provide the mold section for casting the cross arm of the T-shaped slat, the sidewalls 31 and 32 are positioned or spaced laterally outward from elongated sidewalls 14 and 16, respectively, so that the end mold section 30 has a larger transverse cross-sectional area than the elongated section 12. For example, in one preferred embodiment the elongated mold section 12 has a width of 3 inches along horizontal base 18 and flares outward to a width of 5 inches along the top edge of sidewalls 14 and 16. The end mold section 30, on the other hand, has a width of 8¼ inches along base portion 18a and flares inwardly to a width of 6¼ inches along the top edge of sidewalls 31 and 32. While such drafts have been found to provide a well constructed self-spaced and self-secured slotted floor, other drafts can, of course, be utilized. For example, both elongated mold section 12 and end mold section 30 can have a rectangular transverse cross-section.

The length of the elongated mold section 12 (and, consequently, the length of the trunk of the T-shaped slat cast within mold 10) is determined by the position of an end wall or closure member 50 which is moveably positioned between open ends 19a and 19b and held in position by a conventional C-clamp 55. As illustrated, the closure member 50 has a generally inwardly directed planar surface and outwardly flared ends so as to fit snugly between longitudinal sidewalls 14 and 16. Various alternative fastening means can, of course, be utilized to secure closure member 50 a fixed position. Moreover, it should be understood that when only slats of one given length are to be cast within mold 10, closure member 50 does not have to be moveable, but rather can be in the form of a fixed end wall.

A reinforcement rod 60 extending longitudinally within elongated trough section 12 and end mold section 30 is held in position by spacing and supporting devices 61 and 62 carried by horizontal base 18. Numerous spacing and supporting devices of the general clip-on design illustrated in the drawings are presently available. However, no one particular design is critical to the present invention.

In the preferred embodiment, mold unit 10 is constructed of sheet metal. Such a material is readily workable to provide a mold design of the general type illustrated. Numerous other materials, however, can be utilized.

To cast a T-shaped slat within mold 10, the length of the slat desired is first determined and moveable closure member 50 is positioned within elongated mold section 12 and secured thereto by C-clamp 55 so as to provide a mold which will form a T-shaped slat having the desired trunk length. The interior of the mold is then coated with a suitable lubricant to facilitate removal of the cast slat and reinforcement rod 60 is positioned extending longitudinally within mold sections 12 and 30. With mold 10 positioned generally horizontal and the end mold section 30 in its closed position, liquid concrete is poured into the mold 10 wherein it is evenly dispersed and allowed to set. To remove the set concrete, the keyed pins 40 and 41 are withdrawn from the associated openings in the flanges 20 and 21 (as shown in FIG. 3) and the lug casting section is swung to an open position as shown by the dotted lines in FIG. 3. The cast slat is then removed from the mold by lifting upward on the exposed cross-arm of the T-shaped slat. After resecuring the mold section 30 in its closed position, readjusting end member 50 to provide the desired mold length and relubricating the interior of the mold, the mold is then ready for the casting of another slat.

The precast T-shaped slats obtained from mold 10 are assembled in the laterally adjacent trunk-to-cross arm relationship described and illustrated in my copending Pat. application, Ser. No. 79,490, filed Oct. 9, 1970. So assembled, an end portion of the outwardly flared sidewalls of each elongated trunk portion mates in a complementary manner with the inwardly flared sidewalls of the cross arm of the laterally adjacent slat to provide a self-spaced and self-secured slotted floor.

It will, of course, be obvious to one of ordinary skill in the art that numerous modifications can be made to the preferred embodiment described hereinabove without departing from the spirit and scope of the present invention. For example, the cross arm casting section 30 does not necessarily have to be hinged to the trunk casting section 12, but rather can be completely removeable. Further, mold section 12 does not have to be provided within flange portions 20 and 21 if, for example, the cross arm casting section 30 includes a wall portion which is generally a functional substitute for the flange portion.

What is claimed is:

1. Molds for forming a T-shaped slat comprising:
   I. a first mold section having:
      a. an elongated base;
      b. two oppositely facing longitudinally extending sidewalls extending upwardly from said base to define an elongated trough suitable for forming the trunk of the T-shaped slat;
      c. an end wall extending transversely between said sidewalls; and
      d. a substantially open end defined generally by said elongated base and said sidewalls; and
   II. a second mold section having:
      a. a base extending generally transverse of said first mold section at the open end thereof;
      b. a first transversely extending end wall including first and second end wall portions extending generally upwardly from said base and transversely outward from opposite ones of said sidewalls at said open end in said first mold section;
      c. a second transversely extending end wall extending upwardly from said base and oppositely facing said first end wall to define a trough suitable for forming the cross arm of the T-shaped slat; and
      d. two oppositely facing sidewalls extending longitudinally between said end walls and upwardly from said base at a generally complementary angle to the sidewalls of said first mold section, the dimensions of said first and second mold sections being such that a plurality of the T-shaped slats formed therein will provide a self-spaced slotted floor having adjacent ones of said slats mating in a complementary manner when assembled in a laterally adjacent trunk-to-cross arm relationship.

2. The molds of claim 1 wherein:
   a. said longitudinally extending sidewalls of said first mold section extend upwardly and outwardly from said elongated base;
   b. said longitudinally extending sidewalls of said second mold section extend upwardly and inwardly from said transversely extending base; and
   c. said second mold section includes a portion thereof moveably connected to said first mold section.

3. The mold defined in claim 2 wherein:
   a. said longitudinally extending sidewalls of said first mold section each includes a flange portion extending transversely outward therefrom at said open end of said first mold section so as to define said first transversely extending sidewall of said second mold section; and b. said second transversely extending end wall and said longitudinally extending sidewalls of said second mold section are integrally connected and include hinge means associated therewith for hingably connecting said integrally connected end wall and sidewalls to said transversely extending base.

4. Molds for forming slats useable in a self-spaced slotted floor construction, which comprise:
   a. a first mold section having two oppositely facing longitudinally extending sidewalls flared upwardly and outwardly from a longitudinally extending base to define an elongated trough having oppositely disposed open and closed ends; and
   b. a second mold section moveably connected to said open end having a base portion projecting transversely outward from said horizontal base of said elongated section, two oppositely facing longitudinally extending sidewalls spaced laterally outward from a different one of said sidewalls of said elongated section and flared upwardly and inwardly from said base portion, a generally vertical first end wall extending transversely between said sidewalls of said first and second mold sections along the inner edge of said base portion and a generally vertical second end wall extending transversely between said longitudinal sidewalls along the outer edge of said base portion.

5. The molds of claim 4 including a moveable end member extending transversely between the sidewalls of said first mold section so as to define said closed end thereof, said end member being moveable longitudinally within said elongated member so as to vary the length of the elongated trough defined thereby.

* * * * *